Patented June 24, 1930

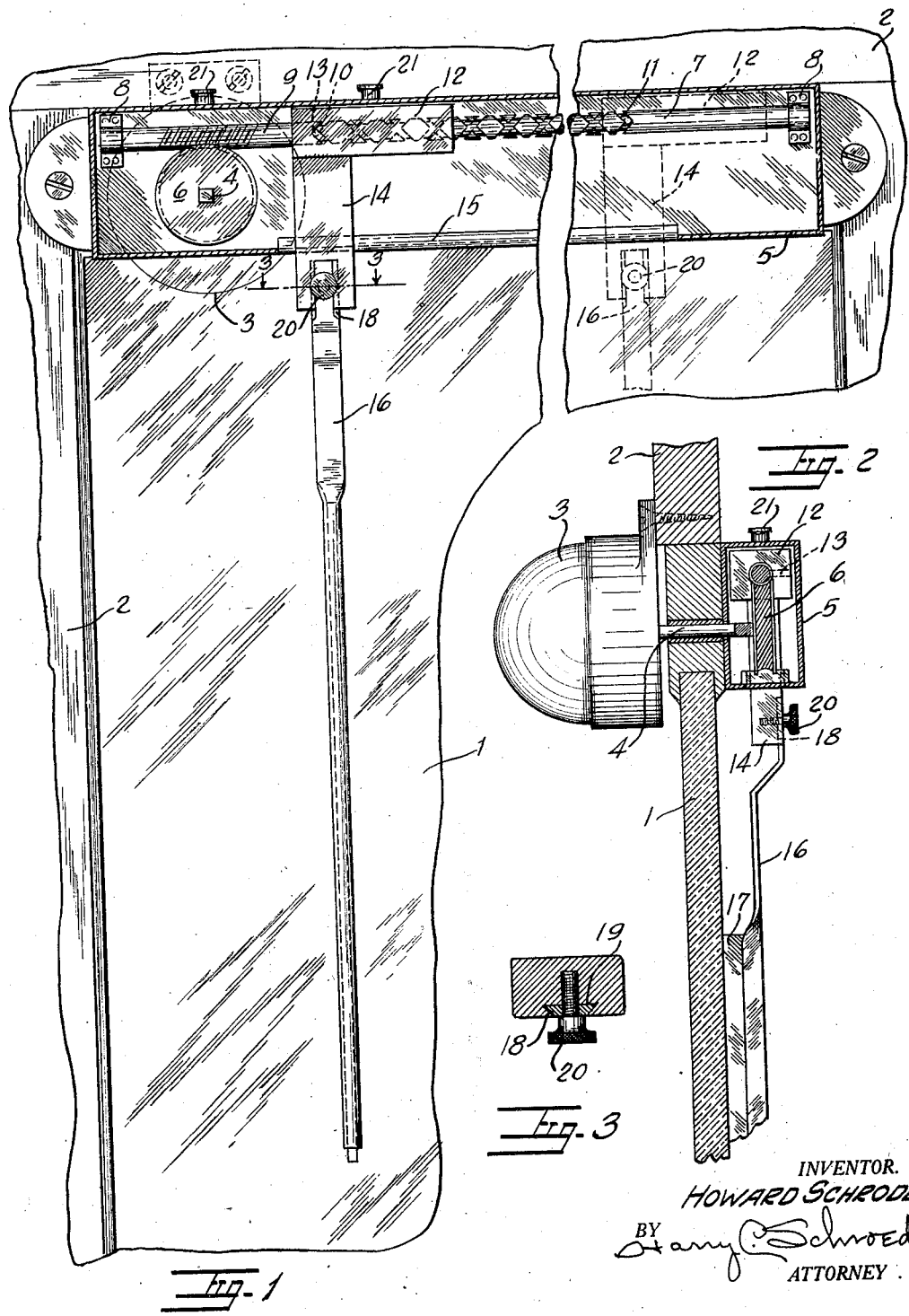

1,765,806

UNITED STATES PATENT OFFICE

HOWARD SCHRODER, OF OAKLAND, CALIFORNIA

WINDSHIELD WIPER

Application filed September 7, 1927. Serial No. 217,906.

The invention forming the subject matter of this application relates to an improvement in windshield wipers, and it consists in the combination, construction and arrangements hereinafter described and claimed.

The principal object of my invention is to provide a windshield wiper in which the rotation of a double threaded screw shaft will cause the wiper to move across the windshield and which will also cause the wiper to be returned on said shaft to the starting position thereof.

Another object of the invention is to provide a device of the type described in which novel means is provided for moving the windshield wiper back and forth across the front of the windshield without necessitating the reversing of the driving means thereof.

The above and other objects in view will more readily appear as the specification proceeds. Although I show and describe the preferred embodiment of my invention, it is to be understood that changes as to the form, design, parts and arrangement thereof may be made by persons skilled in the art without departing from the spirit of or sacrificing any of the advantages of the invention.

My invention is clearly illustrated in the accompanying drawing which forms part of this specification and in which, Figure 1 is a front elevation of the mechanism of my device, as applied to a windshield, the cover of the device being removed, Figure 2 is a sectional view along the line 2—2 of Figure 1, and Figure 3 is a sectional detail view of the securing means of my windshield wiper to the operating mechanism.

In carrying out my invention, I make use of a windshield 1 having a frame 2 adjacent thereto and surrounding the same. An electric motor 3 is secured to one side of the frame member 2 so that the driving shaft 4 thereof extends through the horizontal portion of said frame member 2 into a housing 5 attached to the opposite side of the horizontal member of said frame 2. A worm wheel 6 is secured to the end of the driving shaft 4 and is rotated thereby. A rod 7 is rotatably supported in the bearings 8 disposed at the opposite ends thereof in the housing 5. A worm 9 cut adjacent to an end of the rod 7 is so disposed as to be engaged by the worm wheel 6 and rotated thereby.

An intermediate portion of the rod 7 is double threaded, having a left hand thread 10 and a right hand thread 11 cut thereon so that said left hand and right hand threads are the continuation of each other at the starting and the end point thereof, thus forming an endless thread as shown in Figure 1. A traveler 12 is disposed on the threaded portion of rod 7, having a pin 13 extending therein so as to engage the groove of said endless thread.

A lug 14 is depending from the traveler 12 and extends outside of the housing 5. A slot 15 is provided in the bottom of the housing 5 so as to permit the movement of the lug 14 alongside the windshield.

A wiper arm 16 carries the windshield wiper 17. Said wiper may be made of rubber or the like, and is held firmly between the bent edges of the wiper arm 16. The end of the windshield wiper arm adjacent to the lug 14 is dovetail shaped as at 18 and is slided into the corresponding slot 19, disposed in the lower end of the depending lug 14. A thumb screw 20 is employed to firmly secure the windshield wiper arm 16 to the depending lug 14.

In order to provide means for lubrication the openings 21 are disposed at the top portion of the housing 5, adjacent and opposite to the threaded portions of the rod 7.

The windshield wiping device operates as follows:

Looking at Figure 2 and assuming that the rod 7 is rotated in a clockwise direction by the motor 3 and by the worm wheel 6 it is readily seen that the pin 13 engages the left hand thread 10 and is advanced thereby so that the traveler 12 will move away from the worm 9. The depending lug 14 moves with the traveler 12 in the groove 15 carrying therewith the wiper arm 16 so that the wiper 17 cleans the windshield 1. When the pin 13 traversed the full length of the left hand thread 10 and reached the end thereof the windshield wiper and the lug 12 are in the position shown in dotted lines. At this point the pin will momentarily stop at the end of the left hand thread 10 but as the motor 3 rotates the rod 7 continuously in clockwise direction the pin 13 is forced to continue to travel in the groove of the right hand thread 11. Said right hand thread 11 guides the pin 13 and the traveler 12 back to the original position where the pin assumes the starting position thereof at the end of the right hand thread 11 and at the beginning of the left hand thread 10. It is evident that as long as the rod 7 is rotated the traveler 12 will travel back and forth to the full length of the threaded portion of the rod 7, thereby carrying the windshield wiper back and forth and cleaning the windshield continuously until the motor 3 is stopped. The motor 3 is an electrical motor of any convenient size and is connected to a battery and to a circuit breaker to control the electric circuit thereof. As any convenient type of battery or switch may be used in connection with the motor 3 they were not shown in the drawing.

The simplicity of the device is self evident, the removal on the windshield wiper may be readily effected by simply loosening the thumb screw 20 so as to permit the removal of the windshield wiper arm 16.

Having thus described my invention, what I now claim as novel and desire to secure by Letters Patent is—

A drive mechanism for a windshield wiper, comprising a screw shaft having an endless right and left screw thread rotatably supported alongside the outside face of a windshield, a housing of substantially rectangular cross section secured to the outside face of the windshield and surrounding said screw shaft; a traveler of rectangular cross section slidable inside of the housing and on said screw shaft; a lug for carrying a windshield wiper, depending from said traveler; said traveler projecting downwardly through a longitudinal slot formed in the base of said housing and corresponding in length to the stroke of said traveler; a pin fixedly secured in said traveler and extending into the grooves of the screw shaft, so as to be longitudinally advanced by the rotation of the screw shaft, whereby the traveler is reciprocated in said housing; means for rotating said screw shaft; and oil cups on the outside of the housing opposite said screw shaft and said driving means for lubricating said screw shaft.

In testimony whereof I affix my signature.

HOWARD SCHRODER.